(12) United States Patent
Apuzzo, III

(10) Patent No.: US 10,633,521 B2
(45) Date of Patent: Apr. 28, 2020

(54) CELLULOSIC COMPOSITION CONTAINING COFFEE PARCHMENT CELLULOSE AND USES THEREOF

(71) Applicants: JAVACUBE, INC., New Canaan, CT (US); Joseph Apuzzo, III, New Canaan, CT (US)

(72) Inventor: Joseph Apuzzo, III, New Canaan, CT (US)

(73) Assignee: JAVACUBE, INC., New Canaan, CT (US)

( * ) Notice: Subject to any disclaimer, the term of this patent is extended or adjusted under 35 U.S.C. 154(b) by 0 days.

(21) Appl. No.: 16/478,932

(22) PCT Filed: Jan. 19, 2018

(86) PCT No.: PCT/US2018/014459
§ 371 (c)(1),
(2) Date: Jul. 18, 2019

(87) PCT Pub. No.: WO2018/136763
PCT Pub. Date: Jul. 26, 2018

(65) Prior Publication Data
US 2019/0382560 A1    Dec. 19, 2019

Related U.S. Application Data

(60) Provisional application No. 62/448,079, filed on Jan. 19, 2017, provisional application No. 62/492,455, filed on May 1, 2017.

(51) Int. Cl.
*C08L 1/02*    (2006.01)
*A47J 31/06*   (2006.01)
*C08L 97/02*   (2006.01)
*B01D 39/18*   (2006.01)

(52) U.S. Cl.
CPC ............... *C08L 1/02* (2013.01); *A47J 31/06* (2013.01); *C08L 97/02* (2013.01); *C08L 2205/02* (2013.01)

(58) Field of Classification Search
USPC ................ 210/500.29; 426/482; 162/176; 536/128; 428/34.2
See application file for complete search history.

(56) References Cited

U.S. PATENT DOCUMENTS 3,686,384 A * 8/1972 Runton ............... C08L 97/02
                                                264/122

FOREIGN PATENT DOCUMENTS

WO    2014/107767 A1    7/2014
WO    2017/187024 A1    11/2017

OTHER PUBLICATIONS

Bekalo, et al, "Fibers of coffee husk and hulls for the production of particleboard," Materials and Structures (2010) 43:1049-1060. (Year: 2010).*

(Continued)

*Primary Examiner* — Fred M Teskin
(74) *Attorney, Agent, or Firm* — Abelman, Frayne & Schwab

(57) ABSTRACT

The invention relates to cellulosic composite compositions which contain cellulose derived from coffee parchment. The compositions are especially useful as coffee filters, but may also be used in any way traditionally used for cellulosic composite materials.

18 Claims, 2 Drawing Sheets

(56) References Cited

OTHER PUBLICATIONS

Gilman et al, "Fact Sheet ST-448: Picea abies—Norway Spruce," USDA Forest Service, pp. 1-4; Publication Date: Oct. 1994. (Year: 1994).*

International Search Report for PCT/US2018/014459 dated May 29, 2018.

Funabashi, M., et al., "Effect of filler shape on mechanical properties of rigid polyurethane composites containing plant particles," Macromolecular Symposia, 197(1):231-241 (Jul. 1, 2003).

* cited by examiner

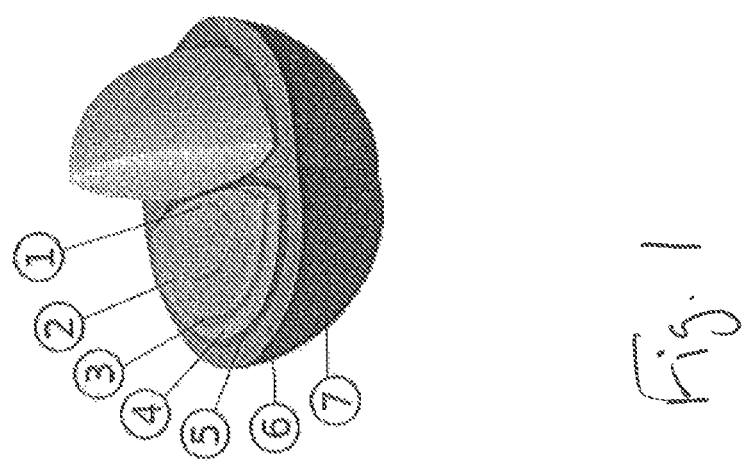

CELLULOSIC COMPOSITION CONTAINING COFFEE PARCHMENT CELLULOSE AND USES THEREOF

FIELD OF THE INVENTION

The present invention relates to uses of waste materials resulting from coffee production, such as coffee husks or other byproducts of coffee processing, particularly coffee parchment, for cellulosic composite materials, especially filters used in the brewing of coffee.

BACKGROUND AND PRIOR ART

Coffee husks and coffee pulp are the solid residue obtained after dehulling coffee cherries during processing. The structure of these coffee cherries is well known, as described herein.

FIG. 1 shows a cross sectional view of the fruit of a coffee tree, i.e., "1" shows a "coffee cherry." Moving from the outermost layer toward the center, one has the outer skin "7," the "pericarp" or "exocarp," then pulp "6," also referred to as "mesocarp," followed by a pectin layer "5," parchment or endocarp "4", silverskin "3," (also referred to as the "testa" or "epidermis"), and finally the coffee beans, or endosperm "2". Usually, each coffee cherry contains two beans which, as is seen in FIG. 1, face each other, with flat sides abutting each other.

Coffee production requires removal of the coffee beans "2" from the coffee cherry, prior to roasting the beans.

Generally, two broad methodologies are known and used for processing the coffee cherries, i.e., the "dry method" and the "wet method."

In brief, historically what is termed the "dry method" has been and is used in countries where water resources are limited. The coffee cherries are spread out on vast surfaces to dry in the sun, and raked and turned throughout the day and covered at night or during rain to prevent them from getting wet until the moisture content of the cherries decreases to approximately 11%.

Alternatively, processing is accomplished by what is termed the "wet method". In summary, the wet method involves removal of the pulp from the coffee cherry and drying the bean with the parchment skin left on. To elaborate, first, freshly harvested coffee cherries are passed through a pulping machine to separate the skin and pulp from the beans. The beans are then separated by weight as they pass through water channels, with the lighter beans floating to the top and heavier beans sinking to the bottom. After passing the beans through a rotating drum to separate them by size, they are transported to a water filled fermentation tank at which point the slick layer of mucilage is removed through fermentation processes. When this is complete, the beans are rinsed and ready for drying.

If processed via the wet process, the beans are still inside the parchment envelope (the endocarp). The beans are dried and these dried beans are then known as parchment coffee. This is in contrast to dry method processing, where all non-bean elements are removed in one step.

Before being exported, parchment coffee typically, but is not necessarily, processed by using a hulling machine which removes the endocarp, thus leaving the exocarp, mesocarp, and endocarp as waste material.

In each case, the goal is to separate the material covering the beans, that is, the outer skin, pulp and parchment, which together, are often referred to as coffee husks.

It has been suggested that there could be significant advantages in finding uses for what is now considered the waste product, i.e., the coffee husks or parts thereof such as the parchment.

One of the significant problems is that both coffee husks and coffee pulp contain organic matter including caffeine, tannins, and polyphenols. Polyphenols are toxic and thus use of materials containing these is restricted. Also, caffeine is a powerful stimulant and is therefore considered to be a negative constituent for, e.g., animal feed.

Although there has been experimental use of coffee husks for uses including livestock feed, silage, composting, biofuels, ethanol production and creation of biogas, none of these processes has resulted in commercially viable products, either because they are unsuitable, per se or, because the cost of modifying them to permit them to be suitable exceeds the current value for the replacement of other pre-existing products.

The patent literature in the art exemplifies the interest in this field of technology. Exemplary of U.S. Pat. Nos. 7,311,864; 7,927,460; 4,379,844; 3,927,235; 4,364,979; and 3,686,384. Exemplary published U.S. Patent Applications include U.S. 2007/0043937; 2007/0065397; and 2015/0354143, and international applications WO 20130556221 and WO 2014081093. The non-U.S. patent literature is extensive and is exemplified by KR 1578324; AU 679190; GB 664848; KR 1703961; JP 03170124; DE 10114341; CN 106223090; CN 106192596; JP 2009167536; JP 2012082550; JP 04296408; JP 04928904; JP 4082999; JP 57014794; JP 7327537; TW 201604350; JP 8070724; JP 8158298; JP 7238488; JP 8029351; JP 10248409; CN 106087521; CN 106087522; KR 1210418; KR 1344471; KR 2011050156; KR 2015028029; CN 106522022; CN 104928979; CN 104947409; and JP 56129157. Attention is drawn in particular to U.S. 20170043937 and U.S. Pat. No. 7,311,864, as well as KR 1578324 and AU 679190. All of these are incorporated by reference in their entirety.

Notwithstanding the considerable literature in this field, the art still needs a method for utilizing the vast amounts of waste materials produced in the manufacture of coffee.

According to the present invention, the waste material of the coffee parchment is purged of polyphenols generally present in the tannins and the resultant fibrous material is retained.

Based on the similarities between the conventional raw materials used in filter making (soft woods like pine and spruce), which are characterized by long, thin cellulose filters and the parchment skin discussed here, which contains shorter, and thicker cellulose fibers, it is presumed that the coffee waste material can be substituted at levels above 50% or at any higher or lower level which suits the user. The chart below illustrates this point (bamboo is another raw material that is presently being used in the manufacturing of filters):

| Analysis of composition of Botanical Materials | | | | |
|---|---|---|---|---|
| | Scotts Pine | Norway Spruce | Coffee Parchment | Bamboo |
| Cellulose | 40.7% | 42.0% | 44.5% | 47.3% |
| Hemicellulose | 26.9% | 27.3% | 28.5% | 23.5% |
| Ligni | 27.0 | 27.4% | 34.0% | 22.1% |
| Extractives | 5.0% | 2.0% | | |
| Ash | | | 0.8% | 1.9% |

The fibrous material is then in turn fabricated into a filter material for use into a coffee filter for brewing coffee. Alternatively, the fibrous parchment material can be fabricated into other paper products such as "sleeves" for holding a cellulose based coffee cup, paper containers or cans (e.g., composite cans) to store and/or serve as packaging for coffee beans, ground coffee so-call "K-cups" as represented by, e.g., U.S. Pat. Nos. 5,325,765; 5,840,189; and 5,637,335, which are incorporated by reference. The fibrous parchment material can also be mixed with other materials, e.g., other wood pulp(s) or recycled paper to form various paper products, such as milk or other beverage containing disposable cups, and so forth. For example, the fibrous material can be fabricated with other cellulosic materials, such as wood pulp fiber, soft wood fiber in particular, and may optionally include up to 1% of a binder material, to produce corrugated cardboard that is suitable, e.g., for the packaging of shipped goods, storage boxes, among other uses. Alternatively, the fibrous parchment material can be fabricated into a paper board material which is suitable for producing paper trays, or paper cores/spools for paper towels, toilet paper, plastic/film/foil wraps or rolls, or other goods which are generally wrapped about a paper core, among other goods/products that use paper board for packaging purposes.

Without limiting the applicability or methodology, the removal of the polyphenolic compounds from plant extracts can be accomplished by using methods such as those described in Geremu, et al., *Chem. Biol. Technol. Agric.,* 3:25(2016), and Collins, et al., *Biochemistry and Molecular Biology International,* 45(4):791-796 (1998), both of which are incorporated by reference, or such other method as shah be known to a person of ordinary skill in the art.

The material can be fabricated into either fibers or sheets with porosity, absorption and adsorption characteristics suitable for filtration.

The foregoing discussion applies to wet method processed coffee. If dry method is employed, the parchment is first separated from the other waste material and then processed as described.

BRIEF DESCRIPTION OF THE FIGURES

FIG. 1 presents a cross sectional view of the coffee berry.

DETAILED DESCRIPTION OF PREFERRED EMBODIMENTS

Figure 2A:
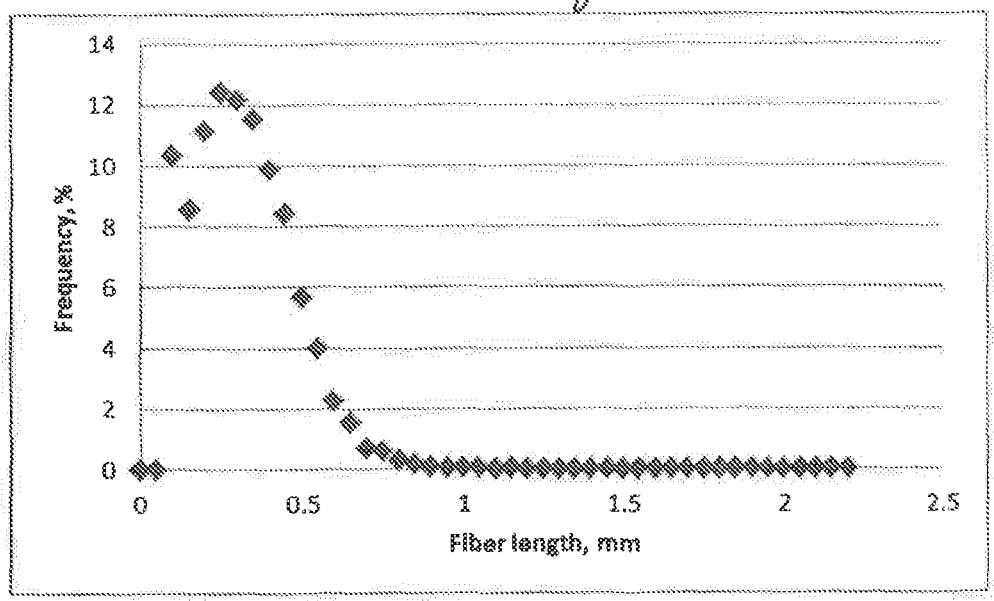
FIGS. 2a and 2b show, respectively, the distribution of coffee parchment fiber by length (FIG. 2a) and width (FIG. 2b).

The following describes analysis of a sample of coffee parchment. The example, follows the well known Kraft cooking process, and presents measurements of parameters well known in pulp and paper manufacturing, including "H-factor," percent of fines, the "cure" and "kink" of the fibers, and the "kappa number." The parchment used had been found to be free of ochratoxin A ("OTA").

One kg of coffee parchment was used, and subjected to the aforementioned Kraft cooking process, using a mixture of $Na_2S$, NaOH, and $Na_2CO_3$. This mixture, known as "white liquor," is a standard reagent used in the Kraft process to separate lignin and hemicelluloses from cellulose, for pulp making. The solution used to treat the coffee parchment contained 29.5 g/l of $Na_2S$ (as $Na_2O$), 66.5 g/l of NaOH, and 35.1 g/l of $Na_2CO_3$. Active alkaline content of the solution was 96 g/l, and sulfidity of 30.7%.

The parchment was treated under the conditions set forth in Table 1. The target kappa Number was 30. The liquor/wood ratio ensured a good mix of liquor and pulping materials.

TABLE 1

| | |
|---|---|
| liquor to wood ratio | 5.0 |
| AA charge, % | 17.5 |
| Sulfidity | 30.7 |
| Maxi Temperature, °C. | 162 |
| Ram to temperature, min. | 90 |
| H-factor | 900 |

The materials were placed in a rotary digester, with 1 liter capacity. Heating was controlled by computer, and when the desired H factor was reached, the process was terminated by soaking the digester in cold water. The spent liquor was collected for residual alkali titration, and cooked materials were washed.

The washed cooked materials were then disintegrated by blending at 3000 rpm. This produced a slurry, which was screened using a flat screen having an 0.008" slot opening.

The screening results in separate "accepted" and "rejected" fibers, which were collected for analysis.

The Kappa Number and residual alkaline content were determined using art recognized methods (Tappi standard T236 cm-85 for Kappa Number; ABC titration for alkaline residue. Both of these are known in the Kraft pulping process).

The results follow in Table 2:

TABLE 2

| | |
|---|---|
| Screen yield, % | 38.74 |
| Rejects, % | 0.30 |
| Total yield, % | 39.04 |
| Residual AA (as $Na_2O$), g/l | 12.47 |
| Kappa number | 37.6 |

Two runs were carried out, and subjected to analysis using a fiber quality analyzer ("FQA"). Results follow:

TABLE 3

Properties of coffee parchment fibers as determined by FQA

| Fiber properties | | Run 1 | Run 2 | Average | St. dev. |
|---|---|---|---|---|---|
| Fines, % | Arithmetic | 6.10 | 6.10 | 6.10 | 0.00 |
| | L. W. | 1.60 | 1.60 | 1.60 | 0.00 |
| Length, mm | Arithmetic | 0.346 | 0.345 | 0.346 | 0.00 |
| | L. W | 0.418 | 0.417 | 0.418 | 0.00 |
| | W. W | 0.491 | 0.489 | 0.490 | 0.00 |
| Mean Curl | Arithmetic | 0.090 | 0.091 | 0.091 | 0.00 |
| | L. W | 0.092 | 0.092 | 0.092 | 0.00 |
| Mean Kink, 1/mm | Kink index | 0.68 | 0.62 | 0.65 | 0.04 |
| | Total Kink angle, ° | 8.30 | 7.74 | 8.02 | 0.40 |
| | Kinks/mm | 0.37 | 0.35 | 0.36 | 0.01 |
| Fiber width | □m | 27.0 | 26.7 | 26.9 | 0.21 |
| Coarseness | mg/m | 0.1856 | 0.1833 | 0.1845 | 0.00 |

To elaborate on these results, an FQA defines an object as a fiber if its length is greater than 0.07 mm. Fines ware fibers with a length of from 0.07 to 1.0 mm.

An arithmetic fine % is calculated as $$\% F = 100 \times \frac{\sum ni}{N}$$

Where $n_i$ is number i fine, and N is the total fiber objects
Length weighted length fine is calculated as:

$$\% F = 100 \times \frac{\sum niLi}{Lt}$$

Where $n_i$ is number of fines with a length of $L_i$, $L_t$ is the total fiber length.
Mean fiber length is calculated as:

$$\text{Arithmetic length: } Ln = \frac{\sum niLi}{\sum ni}$$

Where: $n_i$ is numbers of fibers with Li length $$L.W: Lw = \frac{\sum niLi^2}{\sum niLi}$$

$$L.W.W\ Lww = \frac{\sum niLi^3}{\sum niLi^2}$$

Mean curl:

$$Lw: Cl_{LW} = \frac{\sum Cl_i L_i}{\sum L_i}$$

And $Cl_i$ is defined by the formula:

$$Cl = \frac{L}{l} - 1$$

Where L is contour length (real length) and l is projected length.

$$\text{Kink index: } KI = \frac{2N_{(21-45)} + 3N_{(46-90)} + 4N_{(91-180)}}{Lt}$$

So it is the weighted sum of the number, $N_x$, of kinks within a range of "x" kink angles, divided by the total fiber length of all the fibers.

$$\text{Coarseness: Coarseness} = \frac{\text{Mass of oven dry fiber tested(mg}}{\text{Fiber total} \times Ln(mm) \times \left(\frac{1\ m}{1000\ mm}\right)}$$

These results are compared to results secured from a hardwood sample (eucalyptus), treated in the same process. The hardwood results follow:

| Fiber properties | | Run 1 | Run 2 | Average |
|---|---|---|---|---|
| Fines, % | Arithmetic | 3.54 | 3.30 | 3.42 |
| | L. W. | 0.64 | 0.61 | 0.63 |
| Length, mm | Arithmetic | 0.394 | 0.385 | 0.390 |
| | L. W | 0.481 | 0.473 | 0.477 |
| | W. W | 0.677 | 0.655 | 0.666 |
| Mean Curl | Arithmetic | 0.030 | 0.030 | 0.030 |
| | L. W | 0.030 | 0.030 | 0.030 |
| Mean Kink, 1/mm | Kink index | 0.32 | 0.28 | 0.30 |
| | Total Kink angle, ° | 3.30 | 3.10 | 3.20 |
| | Kinks/mm | 0.19 | 0.17 | 0.18 |
| Coarseness | mg/m | 0.051 | 0.052 | 0.052 |

Figure 2B:
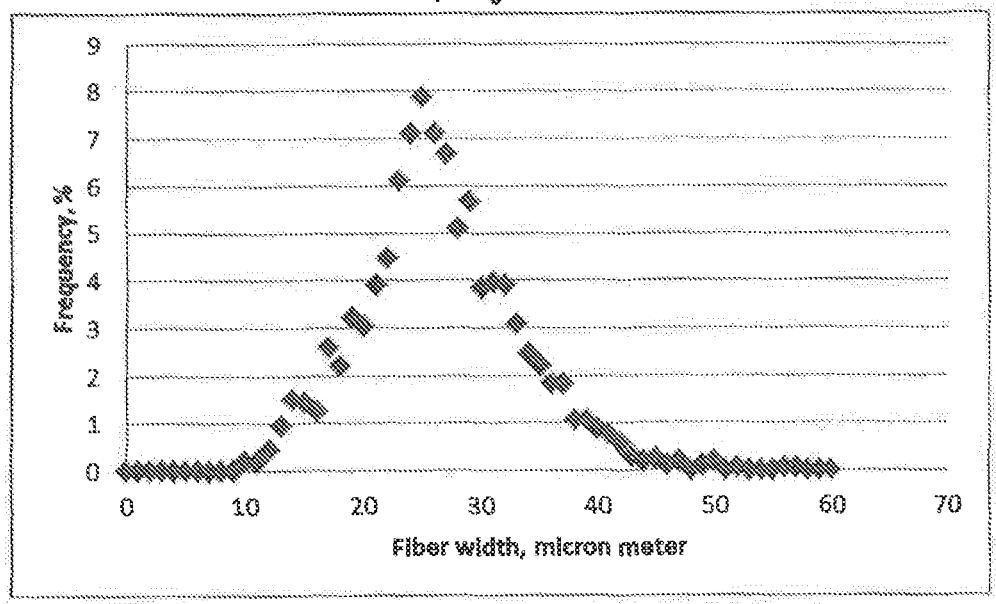

FIGS. 2a and 2b show, respectively, the distribution curve of the fiber length and fiber width for the parchment, based upon the analysis supra.

Using the cellulose component of coffee parchment in cellulose composites, such as those described supra, presents potential advantages in terms of cost, environmental protection, and other areas which the artisan will recognize. Materials such as coffee filters are currently made using cellulose fibers from, e.g., Scotts pine or Norway spruce, because of the longer, thinner fibers of cellulose obtained from these fast growing trees. Eliminating the need to harvest these trees benefits the environment, as does the use of a product (coffee parchment), otherwise considered to be a product with little or no value. The methodologies for making cellulosic compositions in general and coffee filters in particular are well known. See, e.g., Paulaporo, "Paper and Board Grades," in *Papermaking Science and Technology*, 18:114 (2000), incorporated by reference. It is generally known to the artisan, for example, that paper of about 100 g/m$^2$ is required, with filaments about 20 μm wide. The artisan considers factors such as, but not limited to, strength (allowing coffee grounds to collect in the filter), compatibility (resistance to heat and chemical attach), efficiency (ability to retain particles of a given size), and capacity, which is the ability to hold particles while permitting fluid flow. While not wishing to be bound by any theory it is possible that the shorter, thicker cellulose fibers of coffee parchment position within the mesh of other, longer and thinner fibers to provide a stronger filter capable of withstanding more stress than the filters which are currently available. It is also postulated that by varying the quantity of coffee parchment cellulose in the coffee filters, one can produce filters which de facto yield coffee of differing strengths, since the brewed liquid will be retained for varying periods of time, depending upon the percentage of the coffee parchment in the filter.

The foregoing disclosure sets forth features of the invention, which is a cellulosic composite composition, which comprises at least two different forms of cellulose, one of which must be coffee parchment cellulose. The percentage of the composition which is coffee parchment cellulose may vary, as discussed infra and throughout this application.

When the coffee parchment is used in a composite composition to make, e.g., a coffee filter, the remaining cellulose is preferably from a soft wood such as one or both of Scotts Pine or Norway spruce. The cellulosic fibers of these two species are longer and more narrow than coffee parchment cellulose. As suggested by, e.g., Table 3, coffee parchment cellulose fibers have a length of from 0.35-0.50 mm, preferably from 0.4-0.45 mm, and a width of from about 23-30 μm, preferably from 25-28 μm. Additionally, properties of these fibers include a curl of from 0.08-0.10, preferably from 0.09-0.095, and a kink of from 7 to 9, preferably from 7.5 to 8.5.

As noted supra, while not wishing to be bound to any theory, it is believed that the coffee parchment cellulose fibers add a level of strength and stability to composites that is not present in its absence. Increasing the quantity of the inventive cellulose fibers will increase the strength of the composites and, in the case of coffee fibers, increase the retention time of any liquids which pass there through.

The coffee parchment is preferably obtained from wet processed coffee cherries, but dry processed coffee cherries can also serve as a source for the parchment.

As noted, supra, the preferred embodiment of the invention is in the form of a coffee filter; however, the skilled artisan will see the usefulness of the cellulosic composite material in other embodiments, such as filter inserts for disposable coffee "pods," such as the "K-cups" referred to supra, heat protective sleeves for coffee cups, disposable coffee cups or other liquid containers, paper trap, cores, spools, towels, toilet tissue or paper, any corrugated object such as a cardboard box, and so forth.

Other features of the invention will be clear to the skilled artisan and need not be reiterated here.

The terms and expression which have been employed are used as terms of description and not of limitation, and there is no intention in the use of such terms and expression of excluding any equivalents of the features shown and described or portions thereof, it being recognized that various modifications are possible within the scope of the invention.

The invention claimed is:

1. Cellulosic composite paper composition comprising at least a portion of coffee parchment cellulose and at least one other cellulose, in the form of a paper coffee filter, a paper cup sleeve, a disposable paper cup, a paper tray, a paper core, a paper spool, a paper towel, toilet paper, or a corrugated paper box.

2. The composition of claim 1, wherein said at least one other cellulose is wood pulp fiber cellulose.

3. The composition of claim 2, wherein said wood is soft wood.

4. The composition of claim 2, wherein said at least one other cellulose is Scotts Pine or Norway Spruce cellulose.

5. The composition of claim 1, wherein said coffee parchment cellulose is from wet method processed coffee cherries.

6. The composition of claim 1, wherein said coffee method parchment cellulose is from dry processed coffee cherries.

7. The composition of claim 1, in the form of a coffee filter.

8. The composition of claim 1, in the form of a paper cup sleeve.

9. A method for preparing a beverage comprising contacting a liquid to an extractable component contained in the composition of claim 7, to extract a flavor component therefrom, and passing said liquid through said composition.

10. The method of claim 9, wherein said extractable component is coffee beans.

11. The composition of claim 1, in the form of a disposable paper cup.

12. The composition of claim 1, in the form of a paper tray.

13. The composition of claim 1, in the form of a paper core.

14. The composition of claim 1, in the form of a paper spool.

15. The composition of claim 1, in the form of a paper towel.

16. The composition of claim 1, in the form of toilet paper.

17. The composition of claim 1, in the form of a corrugated paper box.

18. Cellulosic composite paper composition comprising at least a portion of coffee parchment and at least one other cellulose.

* * * * *